Patented Nov. 13, 1928.

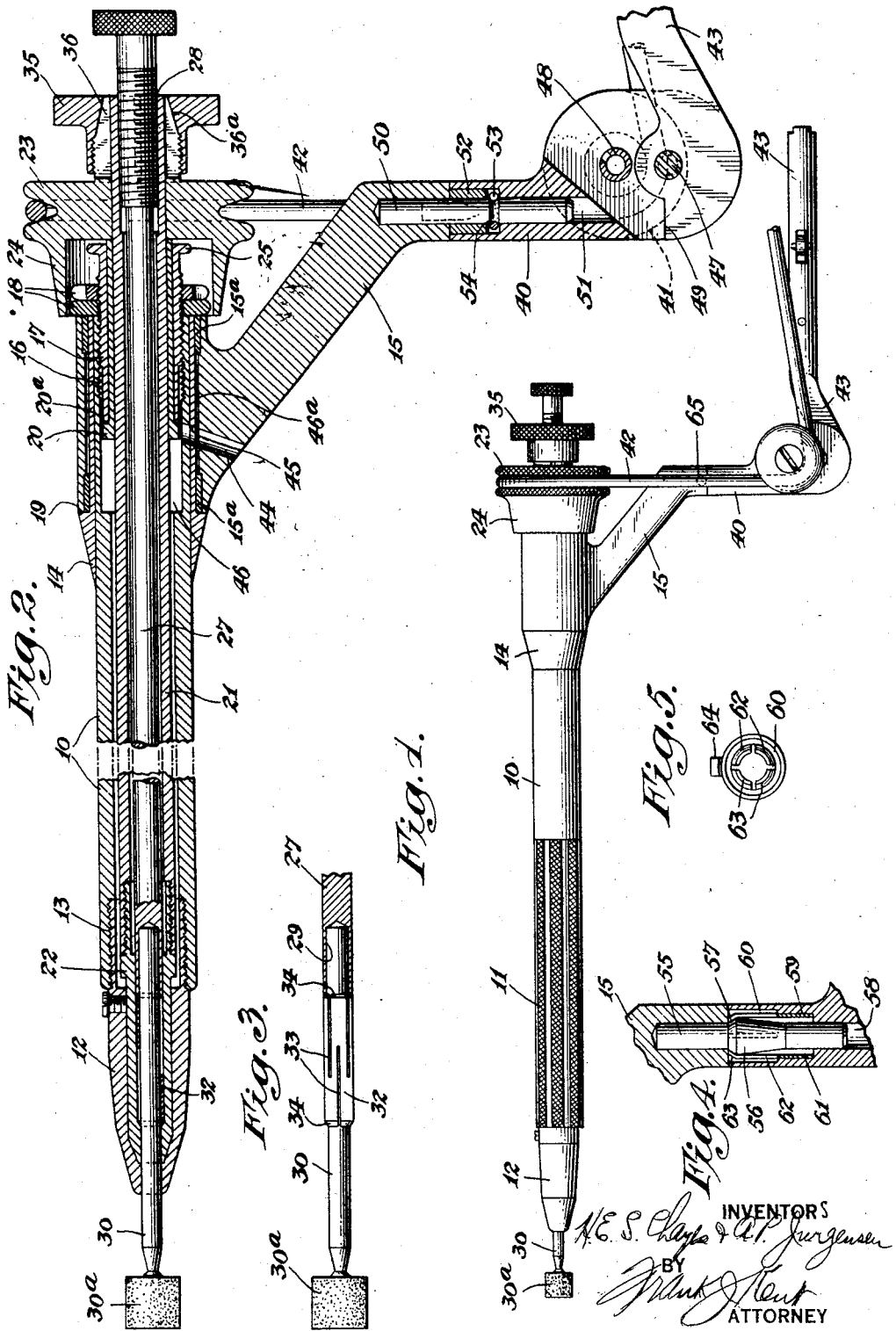

1,691,047

UNITED STATES PATENT OFFICE.

HERMAN E. S. CHAYES AND AUGUST P. JURGENSEN, OF NEW YORK, N. Y., ASSIGNORS TO CHAYES DENTAL INSTRUMENT CORPORATION, OF NEW YORK, N. Y., A CORPORATION OF DELAWARE.

HANDPIECE.

Application filed October 30, 1925. Serial No. 65,716.

This invention relates to a dental handpiece, and has for its object to provide a handpiece which is of light weight, perfectly balanced and free from vibration, which comprises a minimum number of parts, and which can be readily assembled and disassembled.

A further object is the provision of a handpiece the barrel of which is freely rotatable in a bracket, the bracket having a detachable swiveled connection with a hinged arm. The handpiece is so constructed that it can readily be removed from its mounting and immersed in a sterilizing fluid without damage to any of its parts.

In the drawings, in which a preferred embodiment of the invention has been selected for illustration:—

Fig. 1 is a view in side elevation of a handpiece embodying the invention.

Fig. 2 is a view in longitudinal section on an enlarged scale of the device shown in Fig. 1.

Fig. 3 is a detail longitudinal sectional view showing the construction of the spindle and chuck parts.

Fig. 4 is a detail sectional view of a modified form of connection between the bracket-member of the handpiece and the pulley supporting arm; and Fig. 5 is a plan view of the end of the pulley supporting arm shown in Fig. 4.

Referring to the drawings:—

In Figs. 1 and 2 a dental drill head or handpiece is shown which includes an elongated one-piece cylindrical casing 10, preferably formed of duralumin or some other metal or metal alloy of relatively light weight, and having a grooved and knurled portion 11 which facilitates the firm holding of the drill head in the hand of the operator. The cylindrical casing 10 is provided at its forward end with a tapering end section 12 formed of stainless steel or the like and arranged to serve as a bearing member in which the forward end of the spindle structure is journaled. The bearing member 12 is secured in the forward end of the casing 10 by screw-threads 13.

The rearward end of the casing 10 has fitted or secured thereon a sleeve 14 formed of bronze, steel or the like and adapted to serve as a journal having a swiveled relation with an angular bracket member 15 which, in turn, has a swiveled relation with a pulley supporting member 40 about an axis at right angles to the axis of the casing 10, as later referred to.

The rearward end of the casing 19 is internally screw-threaded as at 16 to receive a screw-threaded bearing bushing 17 which may be longitudinally adjusted in the end of the casing 10 by reason of the screw-threaded connection. In order to lock the bearing bushing 17 in a desired adjusted position, lock nuts 18 are provided on the bushing 17, the inner one of which is adapted to bear against the adjacent ends of the casing 10 and bronze sleeve 14, and against the end surface of the bracket member 15. By this arrangement the lock nuts 18 serve not only to hold the bearing bushing 17 in its adjusted position, but also to hold the swiveled parts 14 and 15 in their operable relation, the other end surface of the bracket member bearing against a shoulder 19 formed for the purpose on the bronze sleeve 14.

The bearing bushing 17 forms a bearing for the sleeve 20 of steel or the like secured on a hollow spindle member 21 so that the spindle member 21 is free to rotate within the bearing bushing 17. The hollow spindle member 21 may be made of duralumin or like lightweight metal and at its forward end is provided with an extended journal piece 22, of steel or the like, connected thereto by screw-threads, as shown, and which is journalled in the bearing member 12 already referred to. The hollow spindle member 21 is thereby provided with bearing supports at, or substantially at, its opposite extremities, and is held against axial movement by the engagement of the inner end of the bushing 17 with the flange 20ª on the inner end of the sleeve 20.

In order to rotate the hollow spindle 21 within the casing 10, a pulley 23 is mounted on the spindle 21 so as to rotate the same when the pulley itself is rotated. It will be seen that the position of the pulley 23 is adjacent the rearmost extremity of the casing 10 and that an axially extending hollow flange member 24 projects from the forward face of the pulley 23 into guarding or protecting relation to the lock nuts 18 and the finger piece 25 by which the bearing bushing 17 is adjusted in its seat. With this structural arrangement the adjusting members 18 and 25 are protected from accidental movement by the hands of the operator. On the other hand the covering up of these normally exposed members prevents injury that might otherwise occur to the hands of the operator using the device. The hand-piece is through this arrangement left wholly free from obstructing parts from the forward edge of the pulley flange member 24 to the extreme tip portion of the casing 10. The pulley 23 is clamped or secured upon the rearmost extremity of the spindle 21, by means of the clamping nut 35 which has screw-threaded engagement with a plurality of clamping jaws 36 extending rearwardly from the pulley and fitting about the spindle, and having conical surfaces 36ª adapted to be engaged by a corresponding conical surface on the interior of the nut, so that by turning the nut in one direction or the other, the clamping jaws are caused to grip or release the spindle 21.

An important feature of the invention resides in the construction by which the tool shafts are held in place in the handpiece. This construction includes a longitudinally adjustable shaft or core member 27 which has a screw-threaded relation with the rearmost extremity of the hollow spindle member 21 as at 28 and extends forwardly into the hollow spindle member 21 to a position within the rear portion of the journal piece 22 carried by the end of hollow spindle member 21. The forward extremity of the shaft 27 is hollowed out as at 29 to receive the end of the shaft 30 of a drill or other tool, such as a grinding stone 30ª. The extreme forward portion of the hollow end of the shaft 27 is arranged to engage the rearmost end of a hollow chuck member 32, Figs. 2 and 3, which is longitudinally slit inwardly from its opposite ends for a portion of its length as at 33. The extremities of the chuck member 32 are beveled as is shown at 34 for engaging correspondingly beveled portions formed in the journal piece 22 and on the terminal portion of the shaft 27. The beveled engagement of these parts is such that pressure exerted against the chuck member 32 by the longitudinal movement of the shaft 27, caused by rotating the shaft through the knurled finger piece 37 thereon, compresses or forces the flexible end portions of the chuck 32 inwardly against the tool shaft 30 which may be contained therein. It will be seen that the clamping action which is thus exerted by the chuck member 32 against the contained shaft part 30 will hold the tool rigidly in its operating position. Also, the passing of the tool shaft through the bearing member 12, the journal piece 22, the chuck 32, and into the hollowed-out portion 29 of the shaft 27, provides for the positive aligning of the tool shaft 30 with the axis of rotation of the spindle. The result is that the tool is smoothly driven without lateral vibration so that effective work can be accomplished thereby.

In order to release a tool held by the chuck 32, the shaft 27 is reversely rotated through the knurled finger piece 37, moving the shaft rearwardly and thereby releasing the clutching engagement of the chuck member and permitting the tool to drop from or be removed from its position in the forward extremity of the device.

The shaft 27 and chuck 32 may be readily removed from their positions in the hollow spindle member 21, by turning the threaded portion 28 of the shaft entirely out of engagement with the inner end of the hollow spindle member 21. The shaft 27 may then be completely withdrawn from its position, whereupon the chuck member 32 will drop through the hollow member 21 and out through the open end thereof.

The chuck member is as readily placed in position within the hollow spindle member 21 by merely dropping it into the open bore of the hollow spindle 21 and placing the inner shaft 27 in position. The inner shaft 27 will inevitably take its proper engaging position with the rearmost end of the chuck 32.

The supporting bracket member 15 is swiveled, as has already been stated, to the pulley supporting member 40 on which the pulleys 41 are mounted one on each side thereof. The position of the pulleys 41 is so related to that of the pulley 23 that a belt 42 may be passed around the pulleys 41 and over the pulley 23 the belt extending to a suitable driving pulley, not shown. This insures a proper driving of the pulley 23 in any position to which the handpiece may be moved about its swivel connections. The pulley supporting member 40 is hinged at 47 to a socket member 43 which receives the end of a stem, not shown, on a bracket arm carried by the power supplying device, the hinging movement being limited by the engagement of the pulley shaft 48 with the socket member and with a shoulder 49 thereon. The bracket member 15 is provided in the under portion thereof with an oil receiving opening 44 which, when the parts are inverted, leads to a corresponding opening 45 passing through the sleeve 14 and the wall of the casing 10. By rotating the casing 10 in its seat in the bracket 15 until aligned marks which may be provided are brought into proper position, oil dropped into the opening 44 will pass through the openings 45 into the annular channel 46 between the casing 10 and the rotatable hollow spindle member 21. The oil having reached this chamber will find its way to all parts of the relatively moving portions of the spindle and casing structure.

The barrel portion of the supporting bracket 15 is preferably of somewhat greater internal diameter than that of the sleeve 14 and is provded at each end of its bore with recesses adapted to receive bearing rings 15ª which bear against said sleeve 14 and thus eliminate wear upon the bracket member which is preferably of a light weight metal. These rings also provide clearance between sleeve 14 and bracket 15, which forms a lubricant reservoir 46ª.

The swivel connection between the bracket member 15 and the pulley supporting member 40 comprises a pivot pin 50 seated or secured in the end portion of the bracket 15 and adapted to extend into a central aperture 51 in the pulley supporting member. The central aperture 51 is counter-bored at its outer end to receive a sleeve 52 which is forced therein and serves to hold in place a spl't spring ring 53. The pivot pin 50 is provided with a groove or reduced portion 54 into which the spring ring 53 is adapted to snap when the parts are assembled, as in Fig. 2, to thereby resiliently prevent withdrawal of the pivot pin and to connect the parts so that they may swivel with respect to each other.

A modified form of swivel connection is shown in Figs. 4 and 5, in which a pivot pin 55 is seated or secured in the end of the bracket 15 and is provided with an enlarged conical section 56 to provide an annular recess 57 at the junction of the conical portion with the end surface of the supporting bracket. The lower end of the pin 55 is adapted to extend into a central bore 58 in the pulley supporting member and this central bore is provided with two outer enlarged portions 59 and 60. The inner enlarged portion 59 forms a recess to receive a cylindrical member 61 having a plurality of spring arms 62, the outer ends of which are inturned as at 63 and thereby adapted to fit over the base portion of the conical portion 56 and to enter the recess 57 to thereby hold the parts in connected position while allowing them to swivel one with respect to the other.

The outer enlarged portion 60 of the bore permits the necessary movement of the spring arms 62.

With either form of swivel connection shown the pulley supporting member 40 may be provided with a stop 64 adapted to co-act with a stop 65 on the bracket 15 to limit the extent of the swiveling movement in either direction.

It will be seen that the structure thus provided is relatively light in weight since all but the bearing or journal parts are formed of light-weight metal. The removable swivel provides for ready dismounting of the handpiece, while the all-metal construction provides for the complete sterilization of the device as the device may be immersed in a sterilizing liquid without damage to any of the parts. The unitary structure of the entire length of the handpiece provides a simplified and improved construction. The simplified means for taking apart the construction without the use of tools is a valuable feature of the invention. The device as a whole, is characterized by its simplicity of construction and the facility which is provided for adjusting or assembling the parts.

What is claimed is:—

1. A dental handpiece comprising a casing, a bearing sleeve secured to said casing, a bracket member having a barrel portion surrounding and spaced from said bearing sleeve, and bearing rings mounted in each end of said barrel portion and contacting with said bearing sleeve.

2. A dental handpiece comprising a casing, a bearing sleeve secured to said casing, a bracket member having a barrel portion surrounding and spaced from said bearing sleeve, bearing rings mounted in each end of said barrel portion and contacting with said bearing sleeve, an opening leading through the bracket to the space between the bracket and the bearing sleeve, and an opening leading from the space between the bracket and the bearing sleeve to the interior of the casing.

In testimony whereof we affix our signatures.

HERMAN E. S. CHAYES.
AUGUST P. JURGENSEN.